United States Patent [19]

Hansinger

[11] Patent Number: 5,711,490
[45] Date of Patent: Jan. 27, 1998

[54] AUTOMATIC SPRINKLER

[75] Inventor: William Hansinger, Westbridge, Canada

[73] Assignee: Hansinger Irrigation Systems Ltd.

[21] Appl. No.: 551,488

[22] Filed: Nov. 1, 1995

[51] Int. Cl.$^6$ ................................................. B05B 3/18
[52] U.S. Cl. .................................... 239/745; 239/197
[58] Field of Search ............................. 239/195–198, 239/745, 747

[56] References Cited

U.S. PATENT DOCUMENTS

| | | | |
|---|---|---|---|
| 849,505 | 4/1907 | Schroeder | 239/745 |
| 3,934,819 | 1/1976 | Groelz et al. | 239/745 X |
| 4,003,519 | 1/1977 | Kruse et al. | 239/183 |
| 4,174,804 | 11/1979 | Arlemark | 239/179 |
| 4,346,842 | 8/1982 | Botha | 239/745 X |
| 4,538,761 | 9/1985 | Reprechter et al. | 239/196 |

FOREIGN PATENT DOCUMENTS

| | | | |
|---|---|---|---|
| 63986 | 7/1975 | Canada | 239/745 |
| 222431 | 5/1987 | European Pat. Off. | 239/745 |
| 2614172 | 10/1988 | France | 239/745 |
| 6320080 | 11/1994 | Japan | 239/745 |

*Primary Examiner*—Kevin Weldon
*Attorney, Agent, or Firm*—George A. Seaby

[57] ABSTRACT

In general, mobile agricultural sprinkler machines can be used on smooth terrain only or under conditions permitting travel in a straight line. The apparatus of the present invention is a high pressure, self-propelled, mobile sprinkler which can take a circuitous route over rough terrain. Moreover, the apparatus of the present invention includes several safety features which reduce the likelihood of equipment damage. The safety features include an automatic drive stopping system which halts the sprinkler at a predetermined location. Also provided is a drive shutoff which is engaged if the hose of the apparatus become tangled. The invention also includes a brake for slowing the apparatus as it becomes lighter to prevent the apparatus lurching forward, thereby avoiding the problems of hose tangles and uneven water distribution.

10 Claims, 11 Drawing Sheets

AUTOMATIC SPRINKLER

BACKGROUND OF THE INVENTION

1. Field of the Invention

This invention relates to a mobile irrigation apparatus, and in particular to a sprinkler which is self-propelled by water pressure.

2. Discussion of the Prior Art

Unlike inground or buried irrigation systems, travelling sprinklers require a small capital outlay and can be conveniently transported to wherever they are required. Sprinkler apparatuses of the type disclosed herein which include a wheeled frame, a hose carrying reel mounted on the frame and a drive powered by water bled from the hose were developed to irrigate large tracts of land without the need for constant supervision.

Examples of apparatuses of the type in question include those disclosed by U.S. Pat. No. 3,126,156, issued to Isaac Rinkewich on Mar. 24, 1964; U.S. Pat. No. 3,430,859, issued to Ho Chow on Mar. 4, 1969; U.S. Pat. No. 3,770,202, issued to Alan Ivemy et al on Nov. 6, 1973; U.S. Pat. No. 3,801,579, issued to Hugo Di Palma on May 14, 1974 and U.S. Pat. No. 4,346,842, issued to Theunis Botha on Aug. 3, 1982.

The prior art apparatuses function properly on short vegetation surfaces and allow for large sweeping turns only. None of the prior art apparatuses can be used on rugged terrain or make short radius turns around obstructions. Moreover, none of the prior art apparatuses provides safety features such as an automatic shutoff actuated when the hose becomes tangled on the reel or when the hose is fully reeled. Such safety features, while impractical on a small apparatuses, are necessary for large, high pressure systems to make the systems safe and less susceptible to damage. Another problem not addressed by the prior art is that of maintaining a constant travel speed to ensure an even distribution of water. In apparatuses of the type in question, there is great weight differential between fully hose played out and fully reeled in conditions. During initial travel, the reel on the apparatus is light and the driving force tends to lurch the frame forward which causes hose slack and an uneven speed of travel.

An object of the present invention is to overcome the shortcomings of prior art devices and to solve the above-mentioned problems by providing a self-propelled, mobile sprinkler apparatus which can be steered over rough terrain, and which ensures hose winding without crossing.

Another object of the invention is to provide an apparatus with safety features including an automatic shutoff for actuation upon complete reeling of a hose or when the hose is tangled or crossed.

Yet another object of the invention is to provide an apparatus which travels at constant speed.

GENERAL DESCRIPTION OF THE INVENTION

Accordingly, the present invention relates to a mobile sprinkler for use with a hose in fluid communication with a source of water under pressure comprising frame means; first wheel means supporting a rear end of said frame means for movement along the ground; second, caster wheel means supporting the other end of said frame means; reel means rotatable on said frame means for receiving a hose; drive means on said frame means for rotating said reel means; hose guide means mounted on said other end of said frame means above said second wheel means for slidably receiving the hose, whereby after the hose has been unreeled to define a path of travel, and said reel means has been actuated by said drive means to wind the hose onto said reel means, said hose guide means steers said second wheel means to cause the apparatus to move along said path of travel traced by the hose.

BRIEF DESCRIPTION OF THE DRAWINGS

The invention will be described in greater detail with reference to the accompanying drawings, which illustrate a preferred embodiment of the present invention, and wherein.

It will be noted that, for the sake of simplicity, various elements have been omitted from many figures of the drawings.

DESCRIPTION OF THE PREFERRED EMBODIMENT

Figure 1:
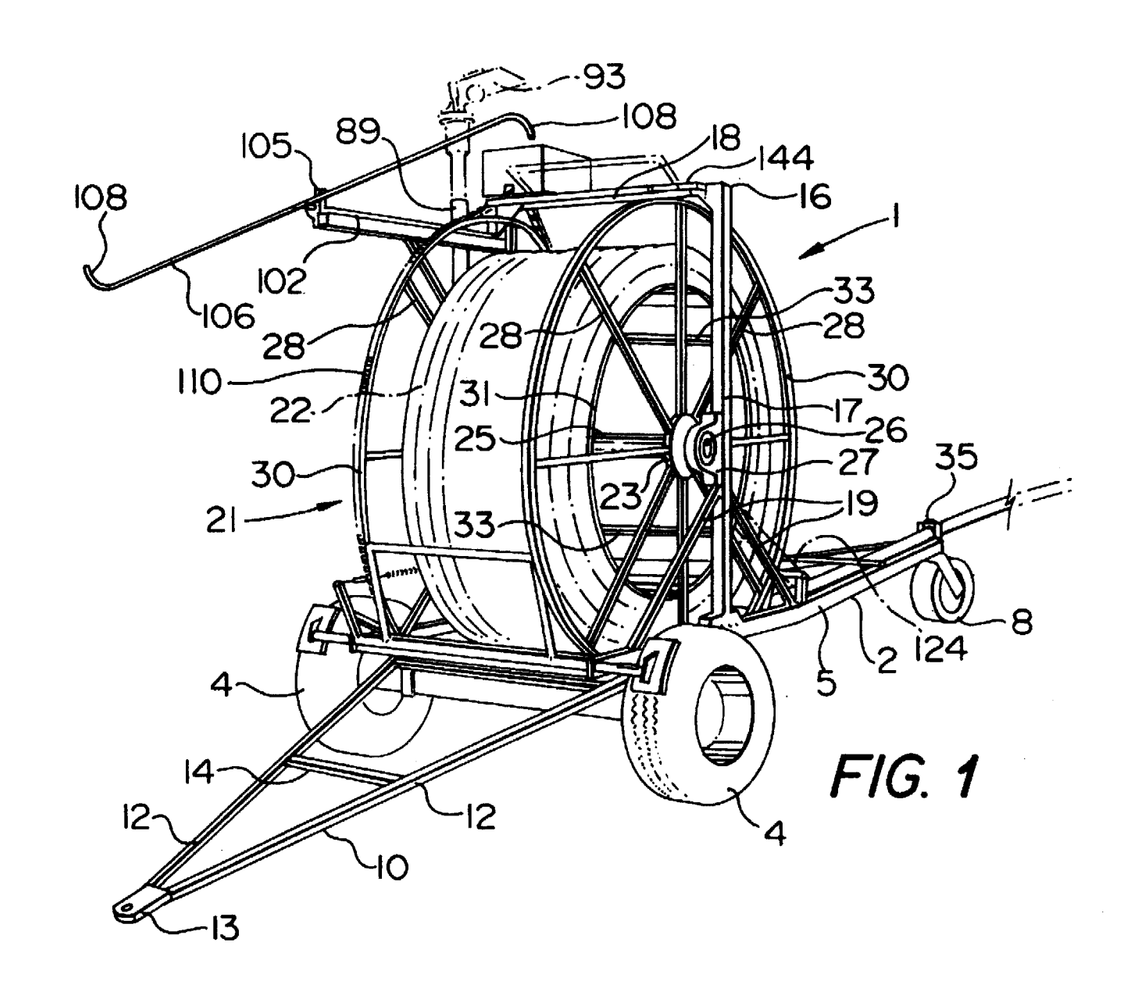
FIG. 1 is an isometric view of the mobile sprinkler apparatus of the invention.
Figure 2:
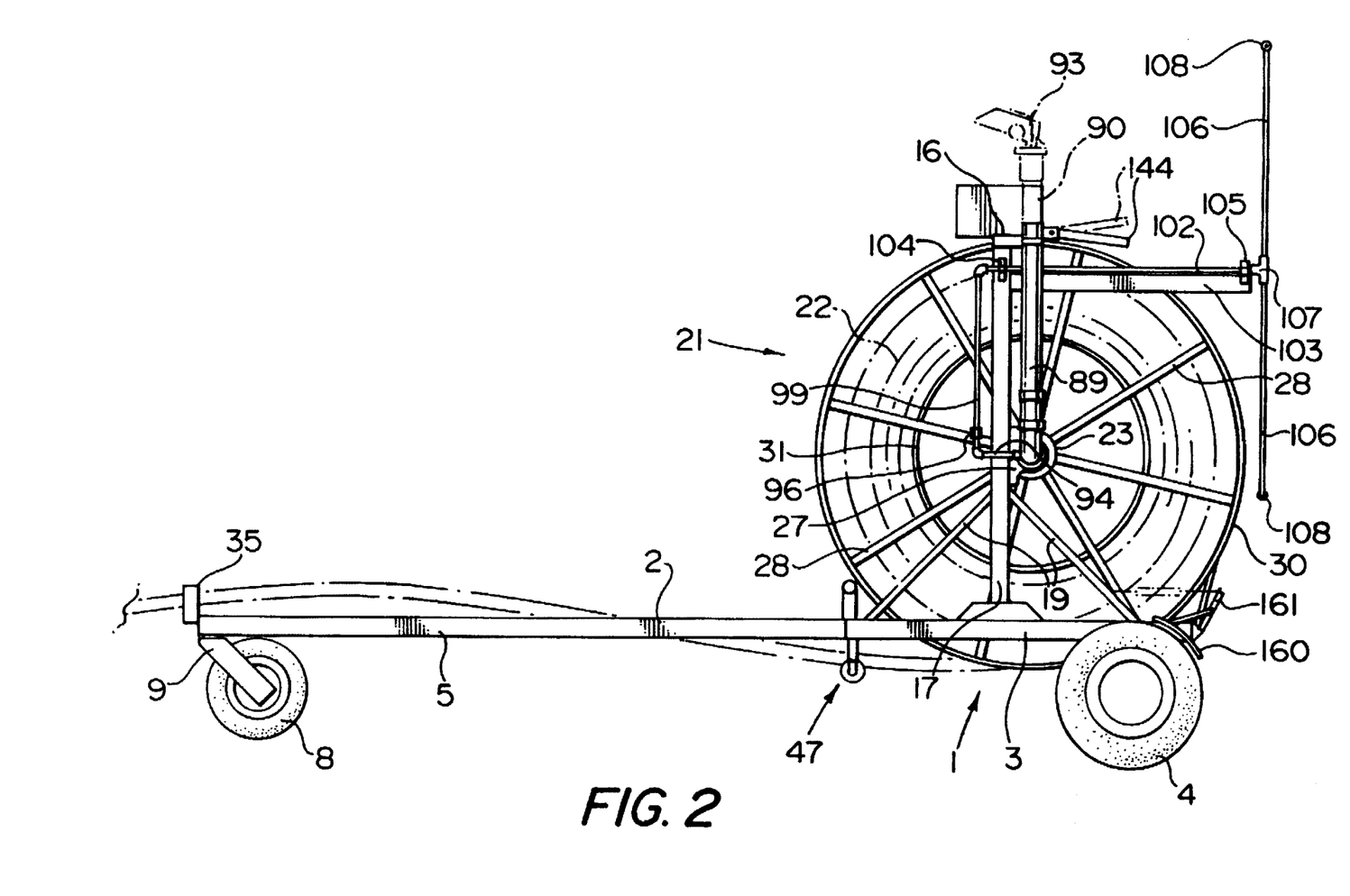
FIG. 2 is a side view of the apparatus of FIG. 2.
Figure 5:
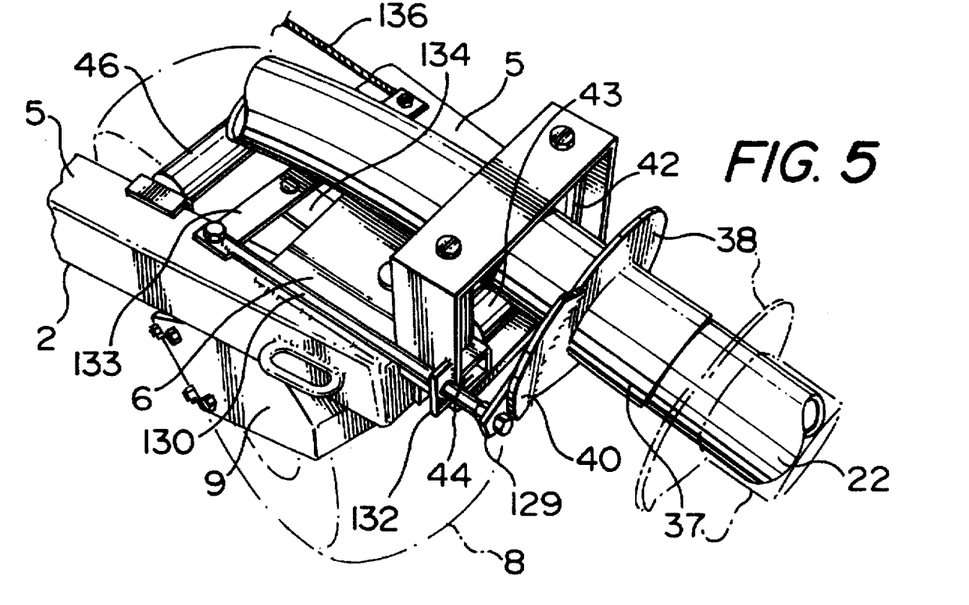

Referring primarily to FIGS. 1 and 2, the sprinkler apparatus includes a frame generally indicated at 1. The frame 1 is defined by a base 2, which includes a rectangular rear portion 3 supported by a pair of wheels 4. A pair of sides 5 converge forwardly from the rear portion 3. The front ends of the sides 5 are interconnected by a plate 6 (FIG. 5). The front end of the base 2 is supported by a caster wheel 8. The wheel 8 is connected to the front end of the base 2 by an inverted U-shaped bracket 9, which can rotate around a vertical axis (not shown). The frame 1 is towed between irrigation sites by a generally A-shaped tow bar 10, which includes a pair of sides 12 pivotally connected to the frame 1. The sides 12 converge to a hitch plate 13. The tow bar 10 is reinforced by a crossbar 14 extending between the sides 12.

A vertical stand 16 extends upwardly from the base 2. The stand 16 includes a pair of posts 17 and a crossbar 18 extending between the top ends of the posts 17. Braces 19 extend diagonally from the base 2 the stand 16 for reinforcing the frame 1.

A large reel generally indicated at 21 carrying a hose 22 is rotatably mounted in the frame 1. The reel 21 includes a pair of annular central hubs 23 with a hollow shaft 25 extending therebetween. The ends 26 (FIG. 1) of the shaft 25 extend through the hubs 23 into pillow block bearings 27 mounted on the posts 17 of the stand 16. Spokes 28 extend outwardly from each hub 23 to a pair of side rims 30. A drum 31 for receiving the hose 22 is mounted between the rims 30. The drum 31 is reinforced by crossbars 33, which extend between opposed spokes 28 for connecting the drum 31 to the spokes.

Figure 3:
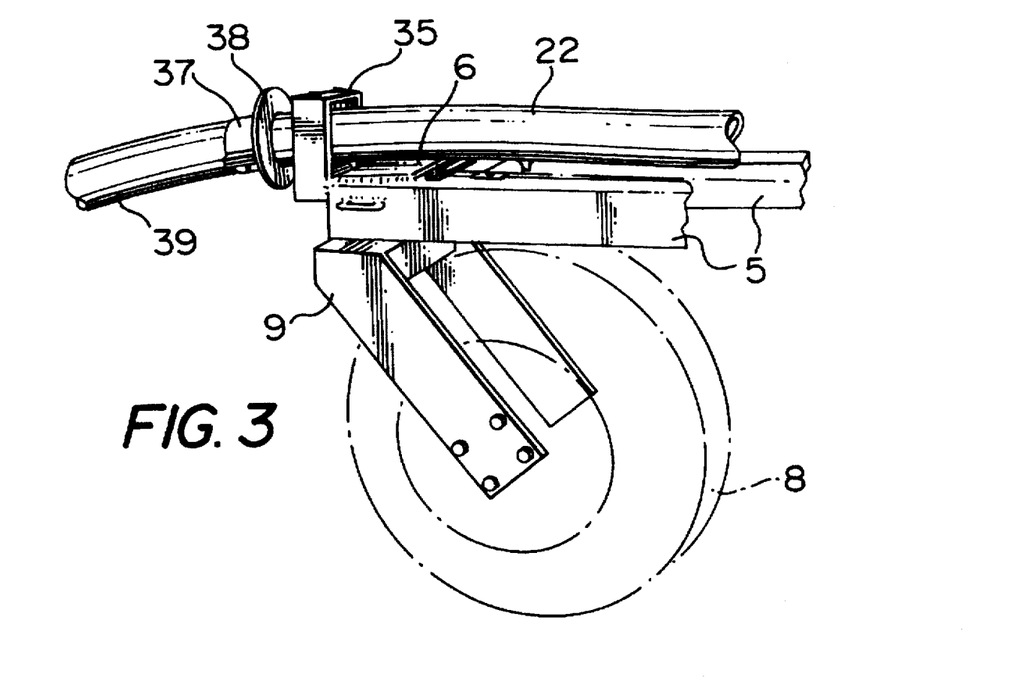
FIGS. 3 to 5 are a variety of isometric views of the front end of the apparatus of FIGS. 1 and 2.
Figure 4:
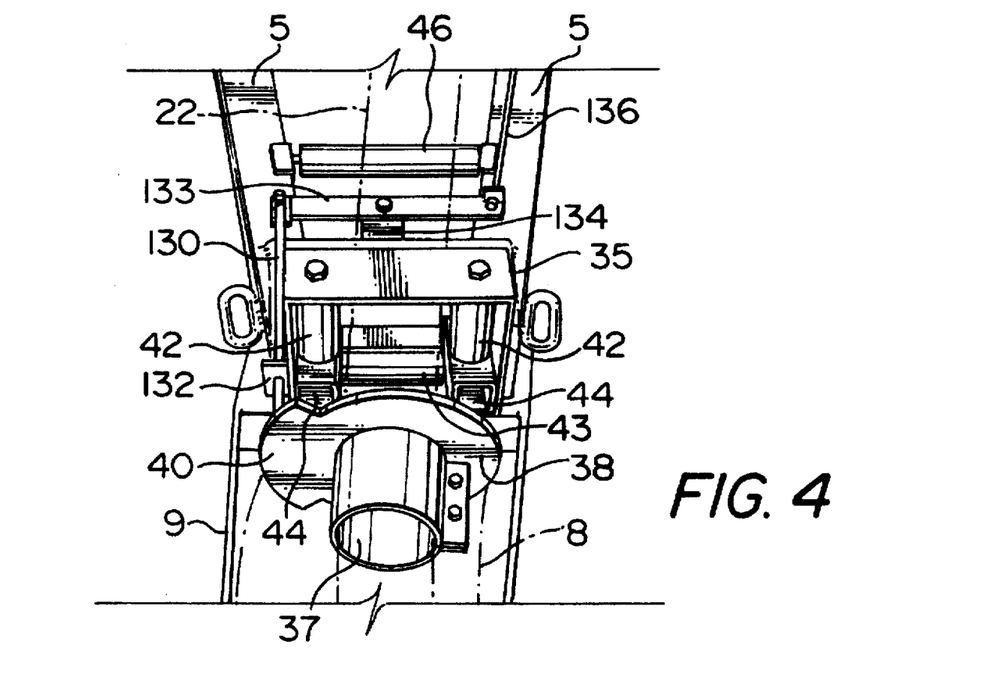
Figure 6:
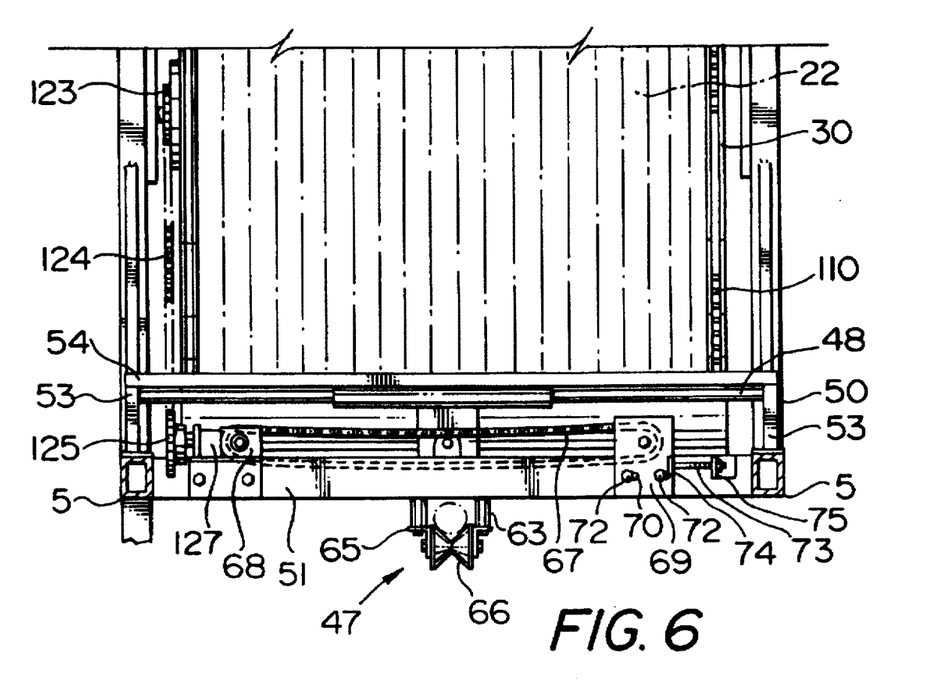
FIG. 6 is a front view of the bottom end of the apparatus of FIG. 1.
Figure 7:
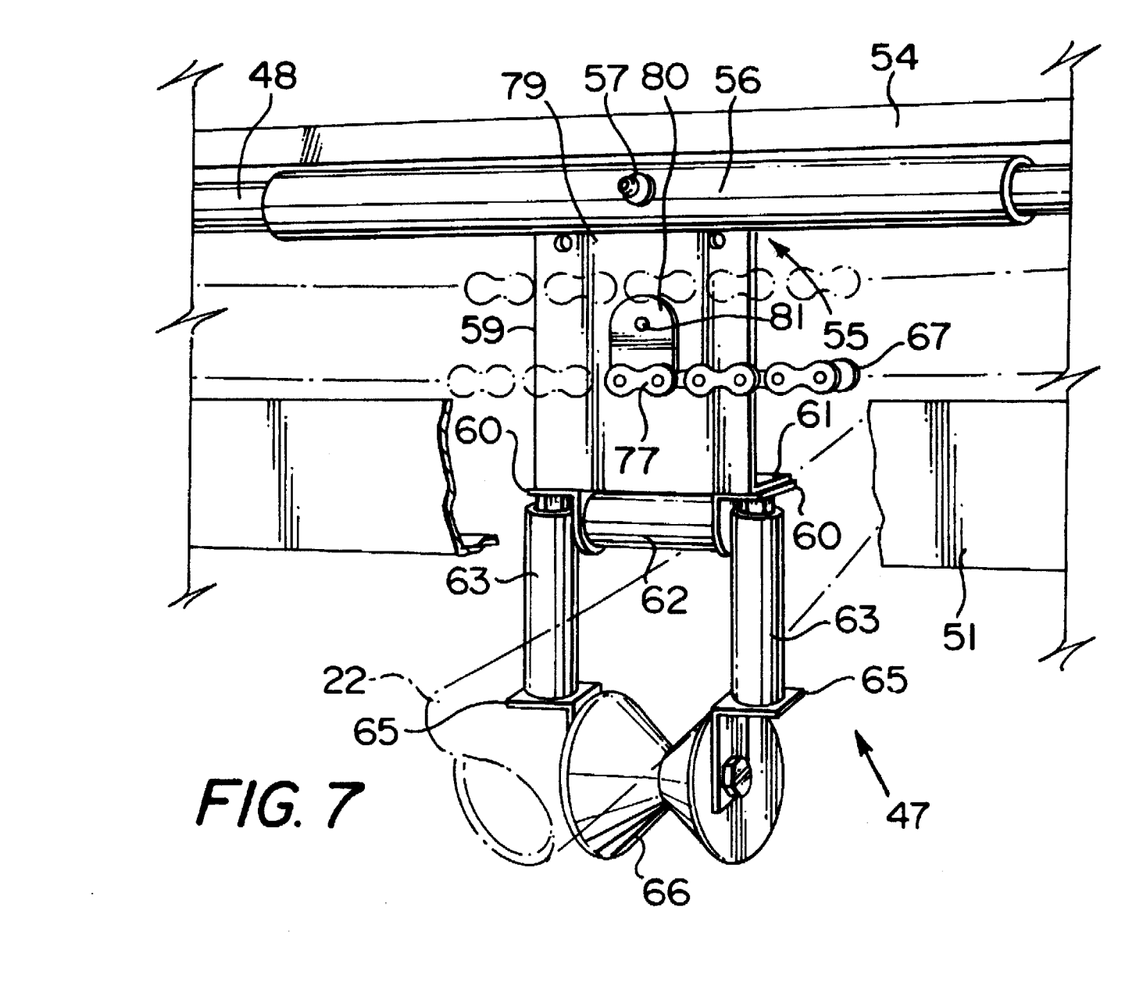
FIG. 7 is a partly sectioned, isometric view of a hose support and guide used in the apparatus of FIGS. 1 and 2.

With reference to FIGS. 3 to 5, a rectangular hose guide 35 is mounted on the front end of the base 2 above the wheel 8. A stop in the form of a split cylindrical bracket 37 carrying an annular plate 38 is mounted on the hose 22 for limiting movement of the outer end 39 of the hose through the guide 35. As shown in FIGS. 4 and 5, an indicator wing 40 defining a stop extends outwardly from one side of the plate 38. The indicator wing 40 forms part of an automatic shutoff described hereinafter in greater detail. A pair of rollers 42 and a bottom roller 43 are provided in the guide 35 for facilitating movement of the hose 22 through the guide. The rollers 42 and 43 are supported in the guide 35 by square cross section tubes 44 at the bottom of the guide. The tubes 44 are connected to the sides 5 of the base 2 and to the plate 6. Hose 22 passing through the guide 35 passes over the front plate 6 and a roller 46 mounted between the sides 5 proximate the front end of the base 2, and then slopes downwardly through a second guide, generally indicated at 47 (FIGS. 6 and 7) which ensures that the hose 22 is uniformly wound on the drum 31, i.e. that in each layer of the hose successive loops are adjacent such other. Of course, at the outer ends of the spool, successive loops are superposed or layered. The guide 47 includes a track 48 defined by a shaft extending across a frame 50 at the front end of the rear portion 3 of the base 2 above a crossbar 51. The frame 50 (FIG. 6) includes posts 53 extend upwardly from the sides of the rear portion 3 of the base 2 for supporting the ends of the track 48, and a crossbar 54 extending between the top ends of the posts 53. A carriage generally indicated 55 is slidably mounted on the track 48 for reciprocating movement transversely of the base 2. The carriage 55 includes a sleeve 56, with a grease nipple 57 therein for sliding on the track 48. An L-shaped plate 59 extends downwardly from the center of the sleeve 56. A pair of L-shaped brackets 60 are mounted on the horizontal arm 61 of the plate 59. The brackets 60 receive short shafts or stub axles (not shown), which support a horizontal roller 62 and a pair of spaced apart vertical rollers 63. Inverted L-shaped brackets 65 on the bottom ends of the stub axles support a horizontal V-roller 66, which supports the hose 22 during passage to the drum 31.

The carriage 55 is reciprocated on the track 48 by a drive including an endless chain 67 extending around sprockets (not shown) mounted on plates 68 and 69 near the ends of the frame 50. While the plate 68 is fixed, the plate 69 can be moved horizontally to adjust the tension on the chain 67. For such purpose slots 70 are provided in the plate 69 for receiving bolts 72. An adjustment bolt 73 extends between a lug 74 on the plate 69 and a second lug 75 on the crossbar 51. One link 77 (FIG. 7) of the chain 67 is connected to the vertical arm 79 of the plate 59 by a lug 80. One end of the lug 80 is welded to the link 77, and the other end of the lug is pivotally connected to the plate 59 by a pin 81. Thus, movement of the chain 67 around the sprockets results in corresponding reciprocating movement of the carriage 55 and the hose 22 transversely of the base 2, whereby the turns or loops of the hose are properly wound onto the drum 31.

Figure 8:
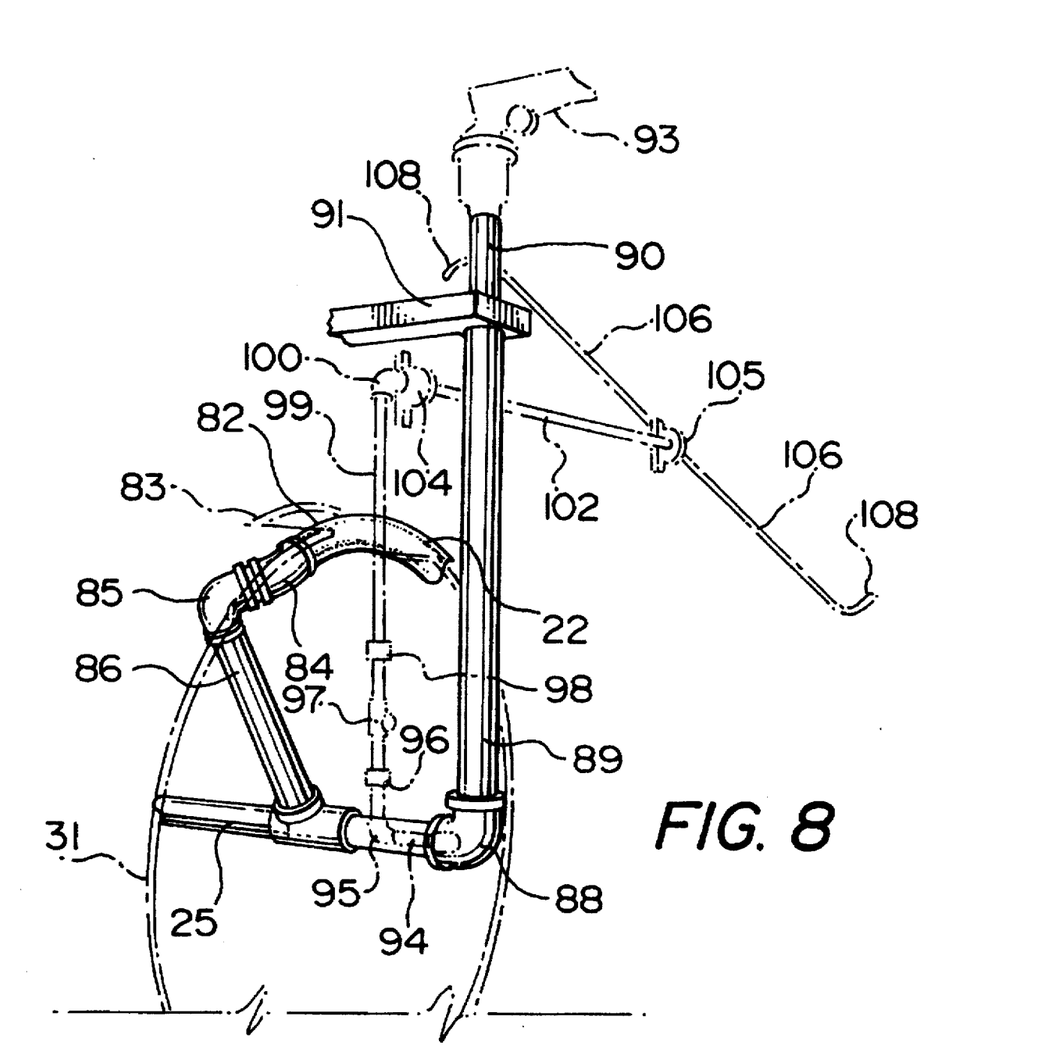
FIG. 8 is an isometric view of a water inlet system used in the apparatus of FIGS. 1 and 2.
Figure 9:
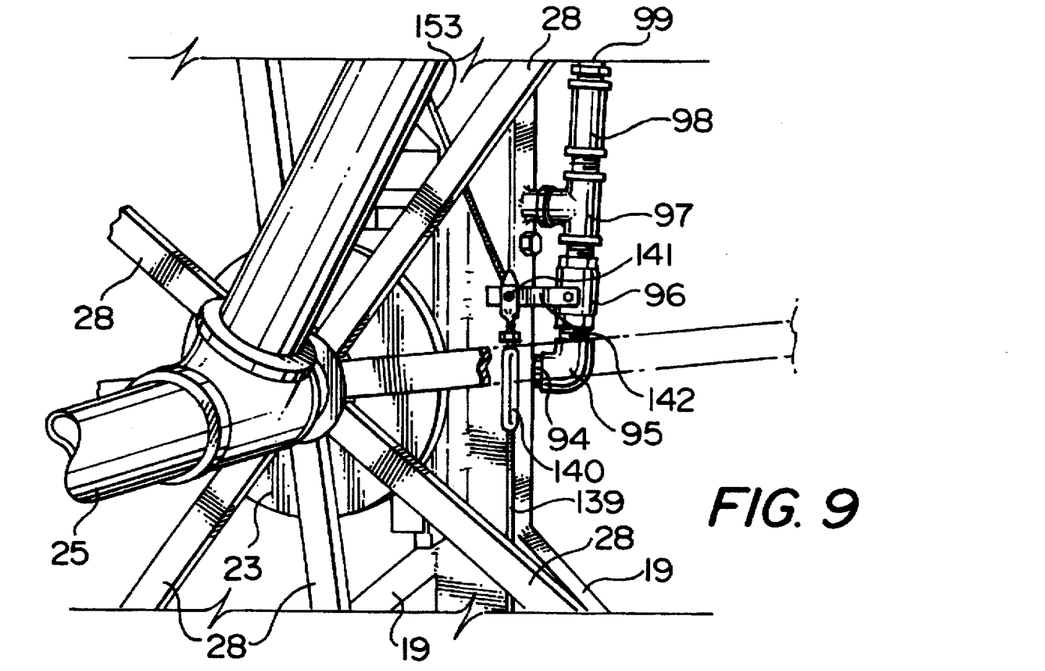
FIG. 9 is an isometric view of a portion of a drive shutoff used in the apparatus of FIGS. 1 and 2.

Referring to FIG. 8, the inner end 82 of the hose 22, i.e. the end directly against the drum 31 passes through a slot 83 in one end of the drum 31. The end 82 of the hose 22 is connected by elbow joints 84 and 85 to a pipe 86 extending radially of the drum 31. The pipe 86 carries water to the central, longitudinally extending hollow shaft 25 carrying the drum 31. The water passes outwardly through one end of the shaft 25 and through a fixed elbow 88 to a vertically extending pipe 89. The upper end 90 of the pipe 89 is supported by the L-shaped outer end 91 (FIGS. 8 to 10) of the crossbar 18. The bulk of the water passing through the pipe 89 is discharged through a sprinkler head 93 mounted on the top free end of the pipe.

Some of the water from the pipe 89 is diverted through a horizontal pipe 94 (FIG. 2), and passes through an elbow joint 95, a needle valve 96, a T-joint 97 (FIGS. 8 and 9), a straight joint 98, a vertical pipe 99 and an elbow joint 100 to a horizontal shaft 102. An arm 103 extends forwardly from one post 17 of the stand 16 and the shaft 102 is rotatably mounted in pillow block bearings 104 and 105 mounted on the top end of the post 17 and on the outer end of the arm 103, respectively. The needle valve 96 (FIG. 9) is provided in the line containing the pipe 99 for controlling the flow of water to the shaft 102. Generally L-shaped, narrow diameter tubes 106 are connected to the outer free end of the hollow shaft 102 by a T-joint 107 (FIG. 2) for receiving water from the shaft. The tubes 106 are diametrically opposed to each other and are perpendicular to the shaft 102. Nozzles 108 on the outer free ends of the tubes 106 eject water under pressure in opposite directions (in much the same manner as a lawn sprinkler) to cause the shaft 102 to rotate. In order to ensure that the ground around the sprinkler does not become too muddy, the shaft 102 extends rearwardly beyond the trailing end of the base 2, and the tubes 106 rotate around an axis parallel to the direction of travel of the apparatus.

Figure 10:
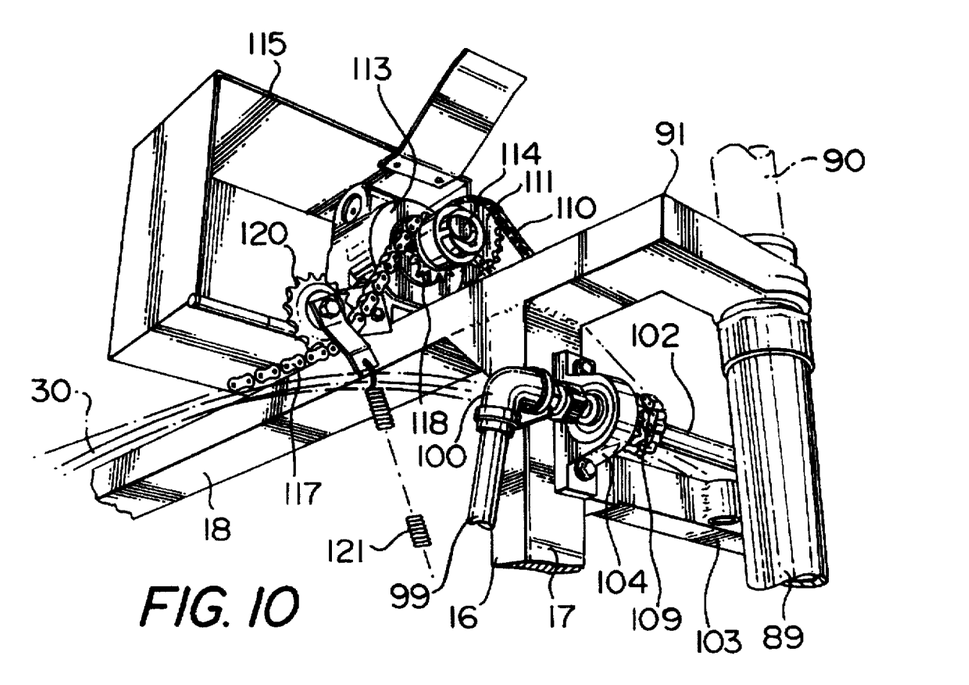
FIG. 10 is an isometric view of the top end of the apparatus of FIGS. 1 and 2 as seen from below.
Figure 11:
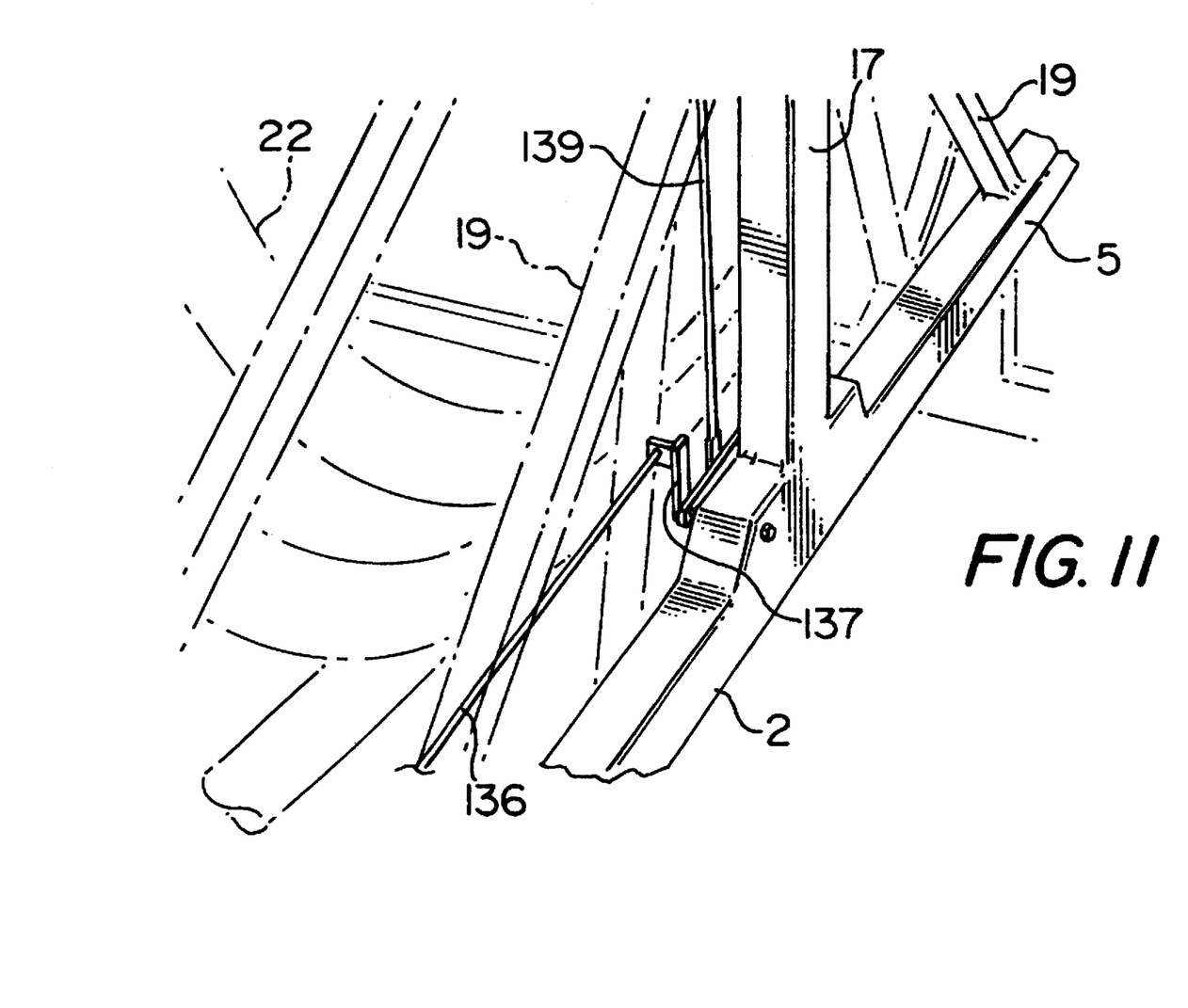
FIG. 11 is an isometric view of a portion of an automatic drive shutoff used in the apparatus of FIGS. 1 and 2.

With reference to FIG. 10, the sprocket 109 is mounted on the shaft 102 near the inner end thereof. A chain 110 connects the sprocket 109 to a second sprocket 111, which in turn is connected to an off-the-shelf gear reduction system 113. A clutch mechanism 114 on the system permits manual disengagement of the drive. The gear reduction system 113 is protected by a box 115 hingedly mounted on the crossbar 18. An endless chain 117 passes around a sprocket 118 mounted on the output shaft (not shown) of the gear reduction system 113 and around one of the rims 30 carrying the drum 31. Thus, when water passes through the shaft 102 and is discharged through the nozzles 108, the shaft and consequently the drum 31 are caused to rotate. The chain 117 is tensioned by means of a sprocket 120, which is connected to the post 17 by a spring 121.

A sprocket 123 (FIG. 6) is mounted on the end of the hollow shaft 25 of the drum opposite to the elbow. An endless chain 124 connects the sprocket 123 to a sprocket 125 at one end of a gear reduction system 127 carrying the chain 67. Thus, a single drive is used to rotate the hose drum 31 and to reciprocate the carriage 55 of the inner hose guide 47. By synchronizing movement of the guide carriage 55 with rotation of the reel 31, even distribution of the hose loops is ensured.

Referring to FIGS. 4, 5, 9 and 11, the automatic drive shutoff mentioned hereinbefore is used to disconnect the reel drive when the apparatus reaches the end of a run, i.e. when the hose 22 is fully taken up on the drum 31. The shutoff includes the indicator wing 40 which is located on the hose 22 near the outer end thereof. When the apparatus approaches the end of a run, the wing 40 contacts a flange or sensor finger 129 (FIG. 5) on the outer free end of a rod 130. The rod 130 is slidably mounted in a bracket 132

(FIGS. 4 and 5) extending outwardly from one side of the front hose guide 35. The inner end of the rod 130 is pivotally connected to one end of a lever 133, which extends transversely of the frame 1 rearwardly of the front end thereof. The lever 133 is pivotally mounted on the outer end of an arm 134, which extends rearwardly from the plate 6 at the front ends of the sides 3 of the base 2. A cable 136 extends rearwardly from the other end of the lever 133 to the top end of a generally L-shaped lever 137 (FIG. 11), the corner of which is pivotally connected to the side of the base adjacent to the post 17. A rod 139 (FIGS. 9 and 11) extends upwardly from the other end of the lever 137 to a turnbuckle 140, which is connected by a bracket 141 to one end of a lever 142. The lever 142 is connected to the needle valve 96 in the pipe 99. Thus, when the hose 22 is fully reeled onto the drum 31, the wing 40 contacts the rod 130 to cut off the flow of water to the nozzles 108 on the tubes 106. Rotation of the shaft 102 ceases which also results in a stoppage in drum rotation, i.e. in reeling activity.

Figure 13:
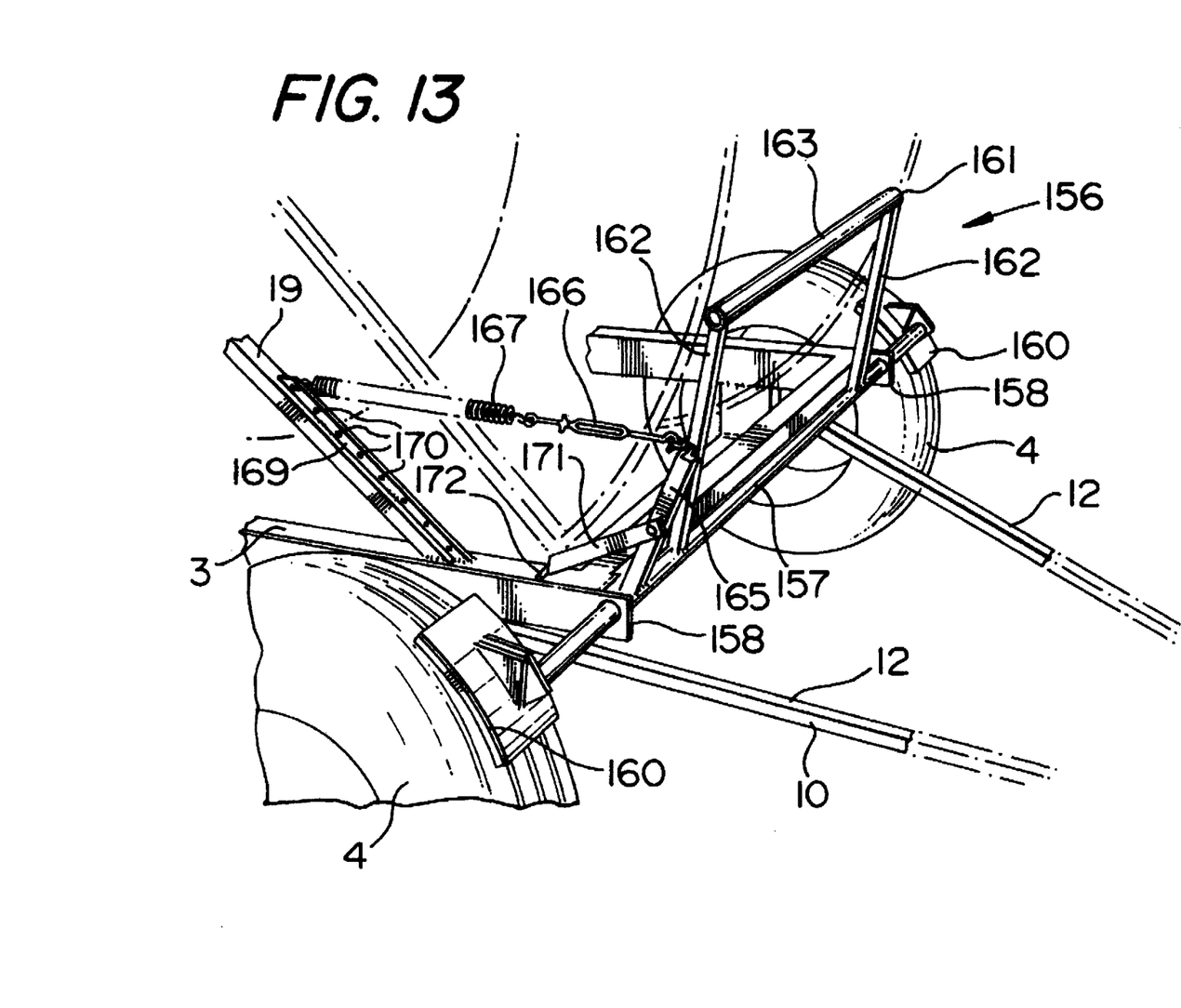
FIG. 13 is an isometric view of a brake used in the apparatus of FIGS. 1 and 2.

A second drive shutoff for use when the hose 22 tangles, i.e. does not wind level on the drum 31 is also provided on the apparatus. As best shown in FIG. 13, the second shutoff includes a hose sensor defined by a rectangular arm 144 pivotally mounted for rotation between bars 145 extending rearwardly from the crossbar 18 of the frame stand 16. The arm 144 includes a front side 147, a rear or outer side 148 and ends 149. The front side 147 extends beyond the ends 149 for pivotally mounting the frame between the arms 145. A lever 150 extends outwardly and downwardly from an outer end of the front side 147 of the arm 144. The outer end of the lever 150 is connected to the valve handle or lever 142 (FIG. 9) by a turnbuckle 152 and a rod 153. The rear side 148 of the arm 144 is normally located above the outermost layer of hose 22 when the latter is fully wound onto the drum. If the hose 22 becomes tangled, the hose piles up in one area causing the arm 144 to pivot around the longitudinal axis of the front side 147 of the frame. Such movement of the arm 144 rotates the lever 150, which pulls the rod 153 upwardly to rotate the valve handle 142. Thus, the valve 96 is closed and the apparatus stops. The turnbuckle 152 is used to adjust the length of the rod 153 to change the rest position of the arm 144, i.e. the level above which the presence of the hose will rotate the arm 144, pull the rod 153 and close the valve 96.

Referring to FIG. 13, a brake system generally indicated at 156 used on the apparatus includes a shaft 157 rotatably mounted in arms 158 extending rearwardly from the sides 3 of the base 2. Brake pads 160 are mounted on the ends of the shaft 157 for frictionally engaging the wheels 4 when the brake system is actuated. The brake pads 160 are oriented in such a manner that the more the shaft 157 is rotated in one direction, the greater the frictional force of the pads on the wheels 4. The shaft 157 is caused to rotate by a generally C-shaped arm 161 connected to the shaft 157. The arm 161 includes a pair of side bars 162 interconnected at their outer ends by a crossbar 163. The distance between the side bars 162, i.e. the width of the arm 161 is less than the distance between the rims 30 of the hose reel. The arm 161 is biased against the hose 22 between the rims 30 by a lever 165, one end of which is welded to the shaft 157. A turnbuckle 166 is connected to the other end of the lever 165, and to a helical spring 167 extending rearwardly from one of the diagonal braces 19. The front end of the spring 167 is connected to a strip 169 on the brace 19 which includes a plurality of holes 170 permitting adjustment of the length of the spring/ turnbuckle combination. The lever 165 can be releasably locked in the outer position (FIG. 13) by a latch arm 171.

One end of the arm 171 is pivotally connected to the center of the lever 165, and the other end of the arm is retained by a stop 172, defined by a projection on the side 3 of the base 2. By pulling the arm 161 rearwardly the arm 171 can be raised and released. When the hose 22 is fully wound on the drum 31, the apparatus is heavy and will not readily roll on a slight incline. In this situation, the brake 156 is not engaged and the wheels are completely free to rotate. As the hose 22 unwinds or unreels, the apparatus becomes lighter and more likely to roll on even a slight incline. Accordingly, as the hose unwinds, the brake is applied to resist such rolling. The arm 161 is biased against the hose 22. Thus, during unwinding of the hose 22 the arm 161 moves with the roll of hose, i.e. rotates with the shaft 157 to apply the brake 156. The thinner the roll of hose 22, the greater the pressure of the brake pads 160 on the wheels 4. When the hose 22 has completely unreeled and the apparatus is relatively light, the brakes prevent lurching of the apparatus.

Figure 12:
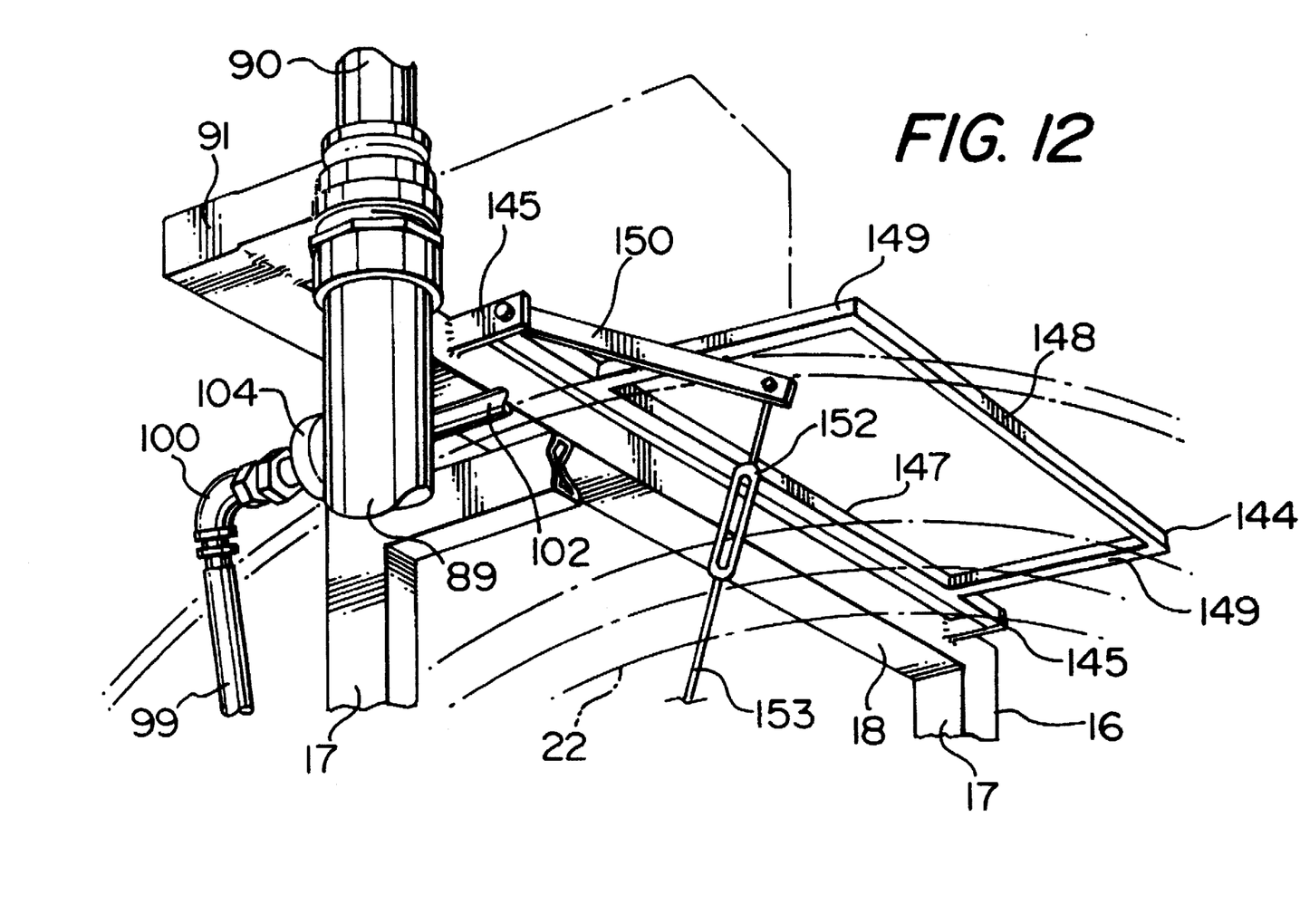
FIG. 12 is an isometric view of a second drive cut-off used in the apparatus of FIGS. 1 and 2.
Figure 14:
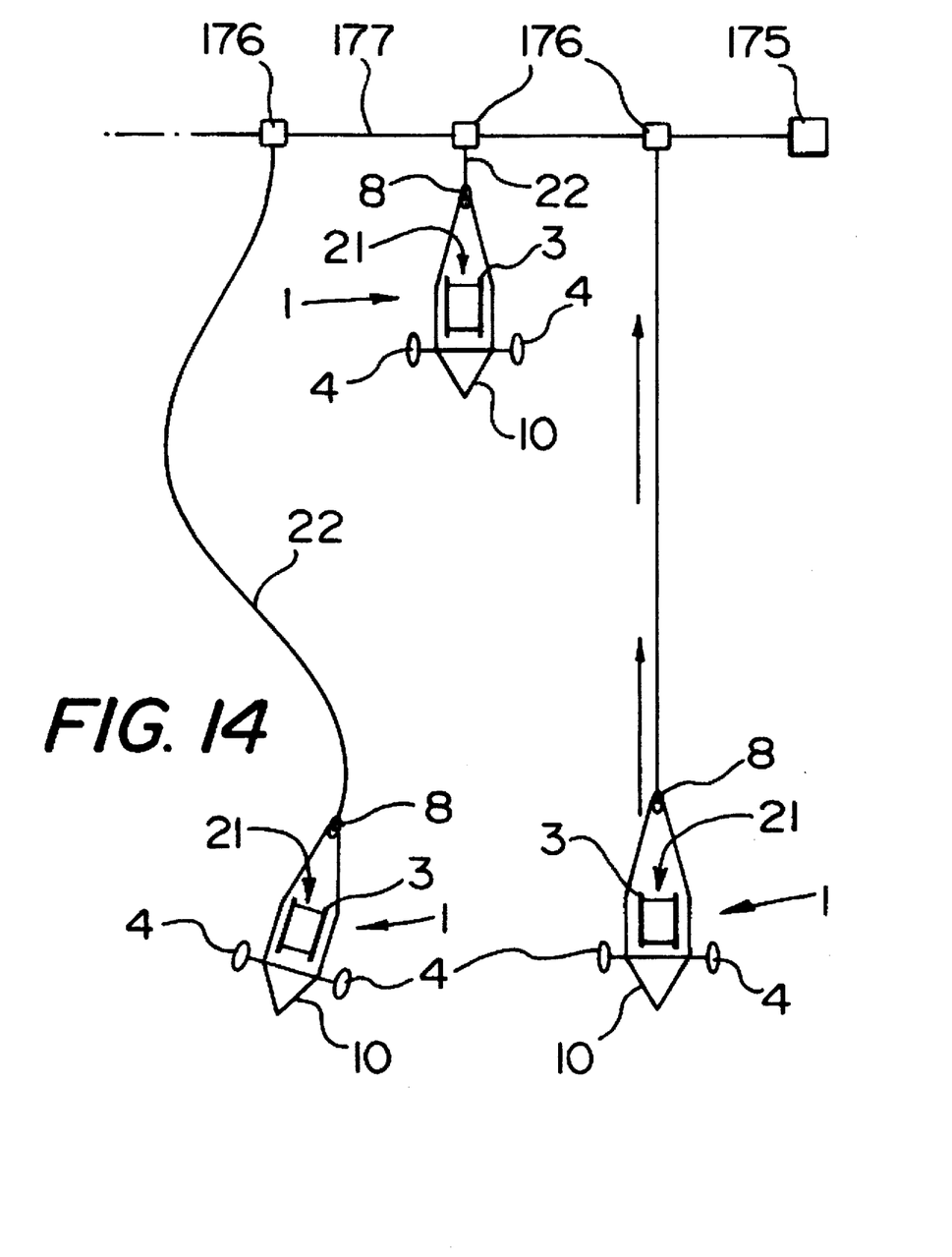
FIG. 14 is a schematic plan view of the apparatus of FIGS. 1 to 13 in operation.

Referring to FIG. 14, in use, the apparatus is connected to a source of water under pressure including (in this case) a pumping station 175 connected to riser pipes 176 by a PVC main line 177. The sprinkler is towed into position in a field using the two bar 10, and the hose 22 is unreeled and connected to a riser pipe 176. When water is pumped into the hose 22, the sprinkler drive is actuated to cause the sprinkler to move forward towards the riser pipe 176. The path of travel can be straight (as illustrated on the right) or sinuous (as illustrated on the left in FIG. 14). When the sprinkler reaches the end of the path of travel defined by the hose 22, the shutoff connected to the hose stops the sprinkler. The sprinkler can be moved to another location using the two bar 10. As mentioned hereinbefore, smooth sprinkler travel is ensured by the brake 156 (FIG. 13), and the machine is stopped in the event of hose tangling by the second shutoff (FIG. 12).

I claim:

1. A mobile sprinkler for use with a hose in fluid communication with a source of water under pressure comprising:
    (a) frame means;
    (b) first wheel means supporting a rear end of said frame means for movement along the ground;
    (c) second, caster wheel means supporting a front end of said frame means;
    (d) reel means rotatable on said frame means for receiving a hose;
    (e) drive means on said frame means for rotating said reel means, said drive means including:
        (i) first, hollow, horizontal shaft means carrying said reel means and rotatable around a horizontal axis on said frame means in fluid communication with the hose,
        (ii) vertical tube means extending upwardly from one end of said first shaft means perpendicular thereto for receiving water from the hose,
        (iii) valve means in said tube means for adjusting the amount of water bled from the hose to said tube means,
        (iv) second horizontal shaft means on a top end of said tube means for receiving water from said tube means;
        (v) nozzle means on an outer free end of said second horizontal shaft means perpendicular to said second horizontal shaft means, and
        (vi) first sprocket and chain means connecting said second horizontal shaft means and said one end of said first horizontal shaft means to said reel means, whereby when water under pressure is bled from the hose and expelled from said nozzle means, said second horizontal shaft means is rotated, and rotational force is transferred through said first gear means to first horizontal shaft means said reel means causing rotation of said reel means;

(f) hose guide means on said front end of said frame means above said second wheel means for slidably receiving the hose, whereby after the hose has been unreeled to define a path of travel, and said reel means has been actuated by said drive means to wind the hose onto said reel means, said hose guide means steers said second wheel means to cause the apparatus to move along said path of travel traced by the hose; and (g) first automatic drive shutoff means including
(i) indicator means on the hose;
(ii) first sensor means on said frame means for determining the presence of said indicator means,
(iii) first valve shutoff means for actuation by said first sensor means to stop the flow of water to said drive means when the hose is wound onto the reel means.

2. An apparatus according to claim 1, wherein said outer free end of said second horizontal shaft means is located rearwardly of said first wheel means, whereby said nozzle means expels water to the rear only of the apparatus during travel.

3. An apparatus according to claim 1, including second hose guide means for evenly distributing the hose across said reel means.

4. An apparatus according to claim 3 wherein said second hose guide means includes track means on said frame means parallel to the longitudinal axis of said reel means for receiving the hose before said reel means; carriage means slidable on said track means; hose support means on said carriage means for slidably receiving the hose; and second sprocket and chain means connected to the other end of said first horizontal shaft means for reciprocating said carriage means on said track means during forward movement of the apparatus, whereby the hose is wound onto said reel means in uniform layers.

5. An apparatus according to claim 1, wherein said first shutoff means includes wing means extending outwardly from the hose; finger means pivotal on said frame means for engagement by said wing means; and linkage means interconnecting said finger means and said valve means for closing said valve means when the wing means engages the finger means.

6. An apparatus according to claim 1, including second automatic drive shutoff means, said second drive shutoff means comprising second sensor means for detecting the thickness of hose windings on the reel means; and second valve shutoff means for actuation by said second sensor means when the hose windings on said reel means exceed a predetermined thickness to stop the flow of water to said drive means.

7. An apparatus according to claim 6, wherein said second shutoff means includes first arm means rotatable on said frame means, said first arm means having an outer free end extending into the path of the hose during winding of the hose onto the reel means; rod means interconnecting said first arm means and said valve means, whereby, when thickness of the hose on the reel means exceeds a predetermined limit, said first arm means is caused to pivot by the hose to pull on the rod means and close said valve means.

8. An apparatus according to claim 7, including level adjustment means for changing the position of said second sensor means relative to said reel means.

9. An apparatus according to claim 1, including brake means, said brake means comprising detector means for detecting the thickness of the hose on said reel means; and actuator means controlled by said detector means for decreasing the amount of friction applied to said first wheel means by said brake pad means as the number of layers of hose windings increase.

10. An apparatus according to claim 9, wherein said brake means includes third shaft means carrying said brake pad means rotatable on said frame means; second arm means carried by said third shaft means and extending across said reel means; and spring means biasing said second arm means towards said reel means and said brake pad means towards said first wheel means, whereby as the thickness of the hose windings on said reel means increases, the friction applied by said brake pad means to said first wheel means decreases.

* * * * *